United States Patent [19]
Kienlen et al.

[11] 3,967,803
[45] July 6, 1976

[54] COLLAPSIBLE TRIVET
[75] Inventors: Loren C. Kienlen; Jack H. Poppler, both of Nisswa, Minn.
[73] Assignee: Doormaid, Inc., Nisswa, Minn.
[22] Filed: Aug. 30, 1974
[21] Appl. No.: 502,075

[52] U.S. Cl. ............................. 248/152; 248/150; 248/346; 403/163
[51] Int. Cl.² ........................................ A47G 23/00
[58] Field of Search ............ 248/46, 346, 152, 431, 248/150, 117.2, 117.3, 146; 403/162, 163, 119, 164; 46/29

[56] References Cited
UNITED STATES PATENTS

| | | | |
|---|---|---|---|
| 1,338,486 | 4/1920 | Bordick | 248/150 |
| 2,312,516 | 3/1943 | Alldredge | 403/162 |
| 3,195,266 | 7/1965 | Onanian | 46/29 X |
| 3,279,730 | 10/1966 | Holmes | 248/46 |
| 3,526,380 | 9/1970 | Tong | 248/46 |
| 3,832,074 | 8/1974 | Dehar | 403/163 |

*Primary Examiner*—Roy D. Frazier
*Assistant Examiner*—Robert W. Gibson, Jr.
*Attorney, Agent, or Firm*—John W. Adams

[57] ABSTRACT

This is a collapsible molded plastic trivet device which comprises a pair of integrally molded pivotally connected elongated plastic arms with upstanding spacer blades formed of the ends of and adapted to be collapsed for efficient storage and thereafter expanded into an operative position and including a strengthening bead around the edge portions of said spacer blades thereby achieving minimum contact area with the utensil and permitting maximum exposure area of the cooking utensil with the ambient air as well as providing the required blade strength for the inexpensive molded plastic construction.

6 Claims, 7 Drawing Figures

COLLAPSIBLE TRIVET

It is an object of this invention to provide a collapsible integrally molded plastic trivet capable of both convenient storage and efficient use in cooling cooking utensils by allowing cooling exposure to the ambient of the maximum percentage of the surface area of the utensil.

It is another object of this invention to provide pivotally connected elongated arms, end arm having a flat inner connector section with an outwardly extending overlapping connecting portion and outwardly disposed vertically oriented spacer blade members extending therefrom, providing support for the utensil, coupled with the maximum exposure of cooling area.

It is another object of this invention to provide a peripheral reinforcing bead around the edges of the spacer blade members to provide the strength needed for inexpensive molded plastic construction.

It is a further object of this invention to provide a reinforcing fillet at the connection of each blade and support the blade in vertically oriented plane while providing the strength needed for inexpensive molded plastic construction.

These and other objects of this invention will be apparent from the following description made in connection with the accompanying drawing wherein like reference characters refer to similar parts throughout the several views, and in which.

Figure 1:
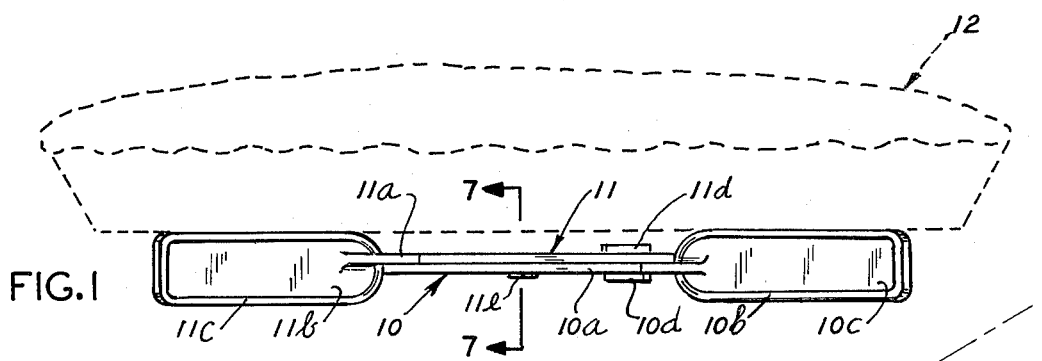
FIG. 1 is a front elevational view of our invention in use.

As shown in the accompanying drawings, our collapsible trivet consists of a pair of integrally molded pivotally connected elongated plastic arms 10 and 11. It is contemplated that these arms will be manufactured from any suitable molded plastic material which will withstand contact with cooking utensils of ordinary oven temperature. Each of the arms has a generally flat horizontally oriented inner connector section designatd 10a and 11a, respectively, and a pair of outwardly disposed vertically oriented spacer blades designated 10b and 11b, respectively, on the outer ends of the respective inner connector portions. Each of the arms also has a gripping element 10d and 11d on the opposite sides thereof from the mating surfaces. These gripping elements facilitate opening and closing of the arms. The center portions of the two arms 10 and 11 are pivotally connected as by a pivot stub shaft 11c with each segment having an outwardly extending enlargement in the form of an enlarged retaining ring 11f around the lower end thereof. The stub shaft 11c is integrally formed with and extends downwardly from the center of the flat inner connector section 11a of the arm 11. This pivot stub shaft 11c is received in snap fit relation in a suitable cooperating aperture 10e formed in the center of the flat inner connector section 10a of elongated arm 10. The plastic material from which the arms are made is sufficiently yieldable to provide the required snap fit connection with the enlarged retaining ring 11f around the lower end of the pivot stub shaft 11c.

The outwardly disposed vertically oriented spacer blade members 10b and 11b, respectively, have a peripheral reinforcing bead designated 10c and 11c formed arond the edges thereof bolstering the strength of the molded plastic construction of the spacer blade members 10b and 11b.

Figure 4:
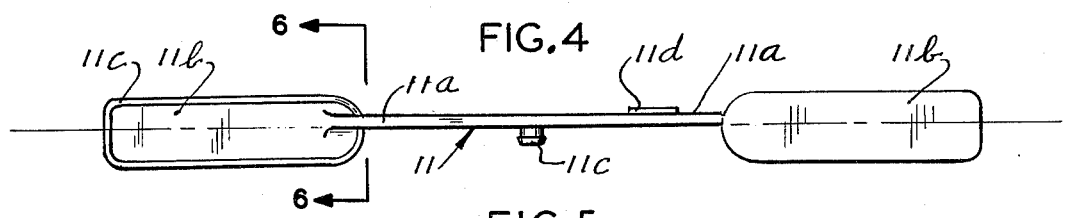
FIG. 4 is an elevational view of one of the elongated arms.
Figure 5:
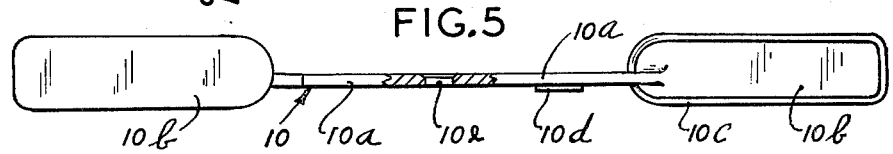
FIG. 5 is an elevational view of the other elongated arm.
Figure 6:
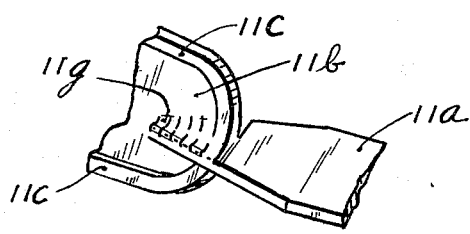
FIG. 6 is a fragmentary perspective view of one of the arms showing the reinforcing fillet; and, FIG. 7 is a sectional view of our invention showing the pivotal connection between the two arms.
Figure 7:
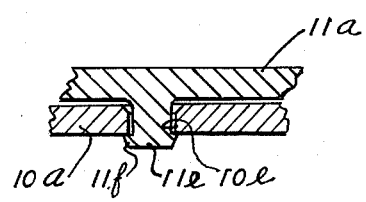

As best shown by FIGS. 4, 5 and 6 the arms 10 and 11 have, at the overlapping juncture of the generally flat horizontally oriented inner arm sections 10a and 11a and the outwardly disposed vertically oriented spacer blade members 10b and 11b, a reinforcing fillet 10g and 11b on the outside portion of the arms 10 and 11, to provide support and are arranged to allow the arms 10 and 11 to come together in a face to face relation in a common meeting plane.

Figure 2:
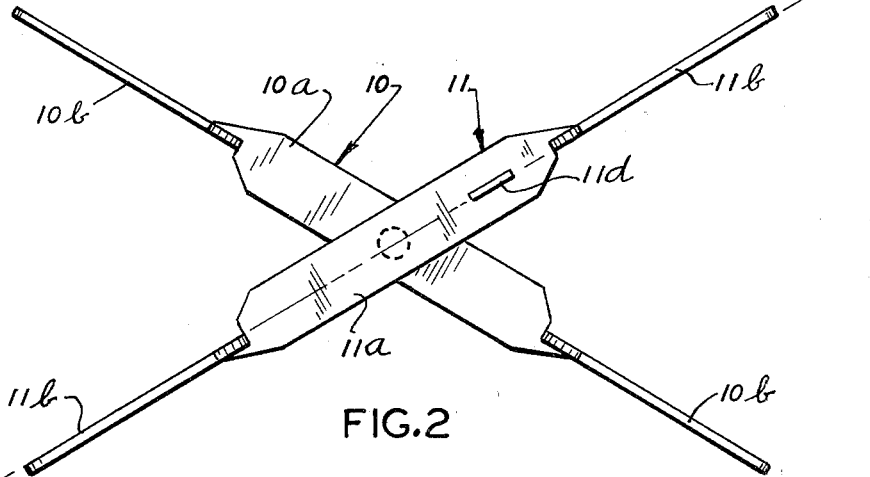
FIG. 2 is a top plan of our invention in the open operative position.
Figure 3:
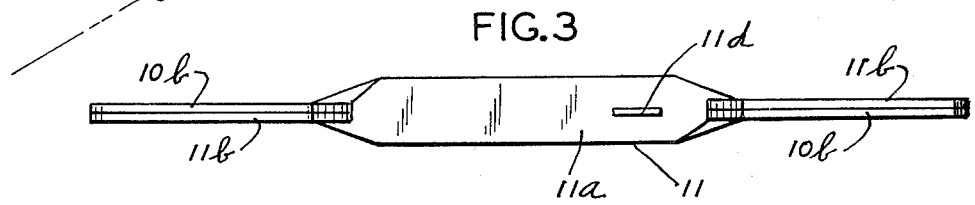
FIG. 3 is a top plan of our invention in the closed position.

The collapsible trivet can be compactly packed and stored in collapsed position, using only a minimum of space, and can be readily opened to a functional position, as best shown in FIGS. 1 and 2. In the expanded operative position the cooking utensil 12 will be elevated from both the cooling surface and the inner connector sections 10a and 11a by means of the spacer blade members 10c and 11c to provide maximum exposure to the ambient air.

It will be seen that we have provided a collapsible trivet which can be inexpensively manufactured and which is strong enough to withstand the weight of ordinary cooking utensils.

It will, of course, be understood that various changes may be made in the form, details, arrangement and proportions of the parts without departing from the scope of this invention as set forth in the appended claims.

What is claimed is:

1. A collapsible trivet comprising a pair of elongated integrally molded plastic arms, each arm having a generally flat horizontally oriented inner connector section and a pair of outwardly disposed vertically oriented spacer blades extending above and below said sections on the respective end portions of the connector section, said outwardly disposed blades each having front and rear surface the generally flat horizontally orientd inner connector sections being pivotally connected to permit the front surfaces of the outwardly disposed blades to be collapsed into face to face relationship for compact storage, the extreme end portions of each of said inner connector sections extending outwardly beyond the inner portions of the ends of the rear surface of the respective blades to provide a positive overlapped connection therebetween while still permitting collapsing of the arms with the blades in face to face relation.

2. The structure set forth in claim 1 wherein each of said blades has peripheral bead formed around the edges thereof.

3. The structure set forth in claim 1 wherein the pivotal connection is formed by a stub shaft integrally molded at the center of one of said arms and received in snap fit relation into a cooperating aperture formed in the center of the other arm.

4. The structure set forth in claim 1 wherein said overlapping end portions are reinforced at their connection with the respective blade elements by means of a reinforcing fillet formed in a manner to permit compact face to face collapsing of the blades.

5. The structure set forth in claim 1 wherein a gripping element is molded on the surface opposite the mating surface of each inner connector section to facilitate opening of the arms into operative position.

6. The structure set forth in claim 3 wherein the stub shaft includes an enlarged retaining ring integrally molded on its end from yieldable plastic so as to securely fasten the two arms together when said stub shaft is inserted through the cooperative aperture in the other arm in snap fit relation.

* * * * *